(12) United States Patent
Sancheti et al.

(10) Patent No.: US 10,154,049 B2
(45) Date of Patent: Dec. 11, 2018

(54) SYSTEM AND METHOD FOR PROVIDING AN IN-LINE SNIFFER MODE NETWORK BASED IDENTITY CENTRIC FIREWALL

(71) Applicant: Preempt Security, Inc., San Francisco, CA (US)

(72) Inventors: Ajit Sancheti, San Francisco, CA (US); Roman Blachman, Givatayim (IL); Amir Jakoby, Nathania (IL); Eyal Karni, Kochav Yair (IL)

(73) Assignee: Preempt Security, Inc., San Francisco, CA (US)

(*) Notice: Subject to any disclaimer, the term of this patent is extended or adjusted under 35 U.S.C. 154(b) by 70 days.

(21) Appl. No.: 15/151,001

(22) Filed: May 10, 2016

(65) Prior Publication Data
US 2017/0244730 A1    Aug. 24, 2017

Related U.S. Application Data

(60) Provisional application No. 62/160,748, filed on May 13, 2015.

(51) Int. Cl.
*H04L 29/00* (2006.01)
*H04L 29/06* (2006.01)
*H04L 29/08* (2006.01)

(52) U.S. Cl.
CPC ...... *H04L 63/1416* (2013.01); *H04L 63/0245* (2013.01); *H04L 63/0272* (2013.01); *H04L 63/20* (2013.01); *H04L 67/20* (2013.01); *H04L 2463/082* (2013.01)

(58) Field of Classification Search
CPC .......... H04L 63/1416; H04L 63/0245; H04L 63/0272
USPC ........................................................ 726/23
See application file for complete search history.

(56) References Cited

U.S. PATENT DOCUMENTS

| | | | |
|---|---|---|---|
| 2005/0018618 A1* | 1/2005 | Mualem | H04L 63/1458 370/252 |
| 2007/0067620 A1* | 3/2007 | Jevans | H04L 63/0823 713/156 |

* cited by examiner

*Primary Examiner* — Brandon S Hoffman
*Assistant Examiner* — Michael D Anderson
(74) *Attorney, Agent, or Firm* — K&L Gates LLP

(57) ABSTRACT

The instant disclosure is directed to an attack/unwanted activity detecting firewall for use in protecting authentication-based network resources. The instant system is adapted for installation inline or in sniffer mode. In various embodiments, defined rules are applied to network traffic to determine whether certain types of attacks are occurring on the network resources. If one such attack is detected, the system provides for several potential responses, including for example disconnecting the attacking remote machine, requiring the user at that machine to re-authenticate, and/or requiring a second factor of authentication from the user at that machine. In some example embodiments, regardless of any activity required of a user at the remote machine suspected of malicious behavior, the disclosed system generates an alarm or other alert for presentation as appropriate, such as via a graphical user interface or a third-party system using an API.

21 Claims, 10 Drawing Sheets

Proxy Mode Deployment

Figure 1: Proxy Mode Deployment

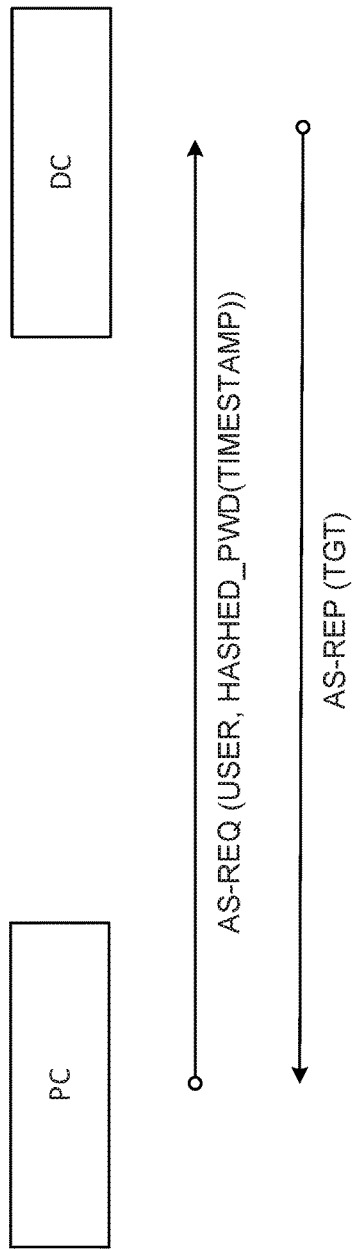
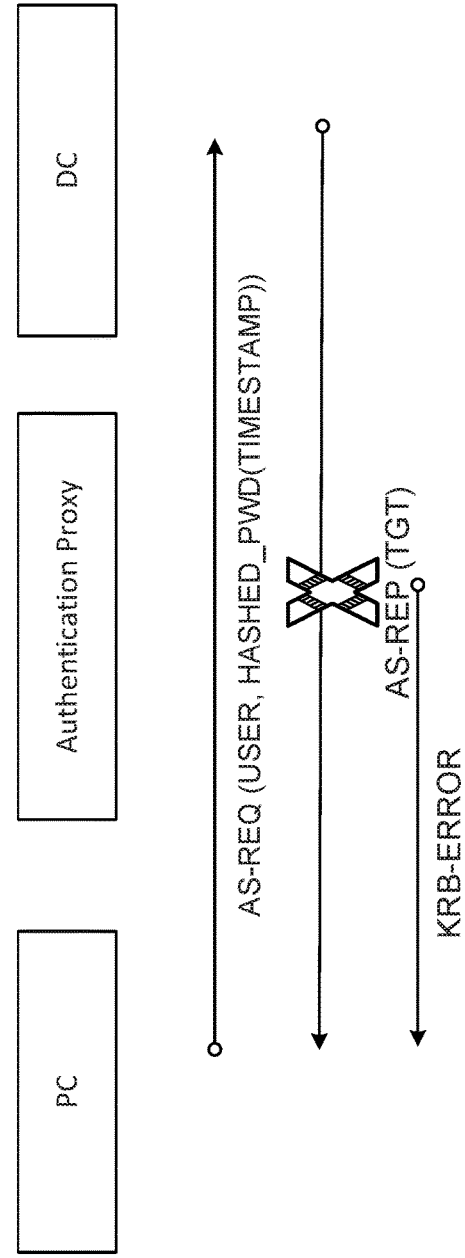

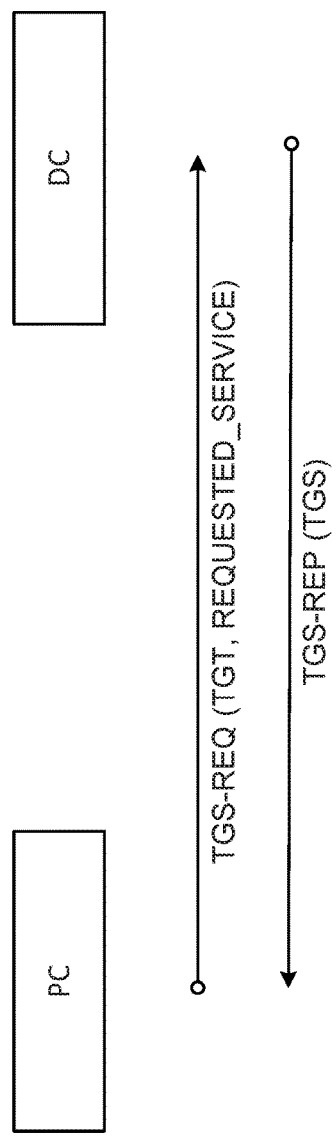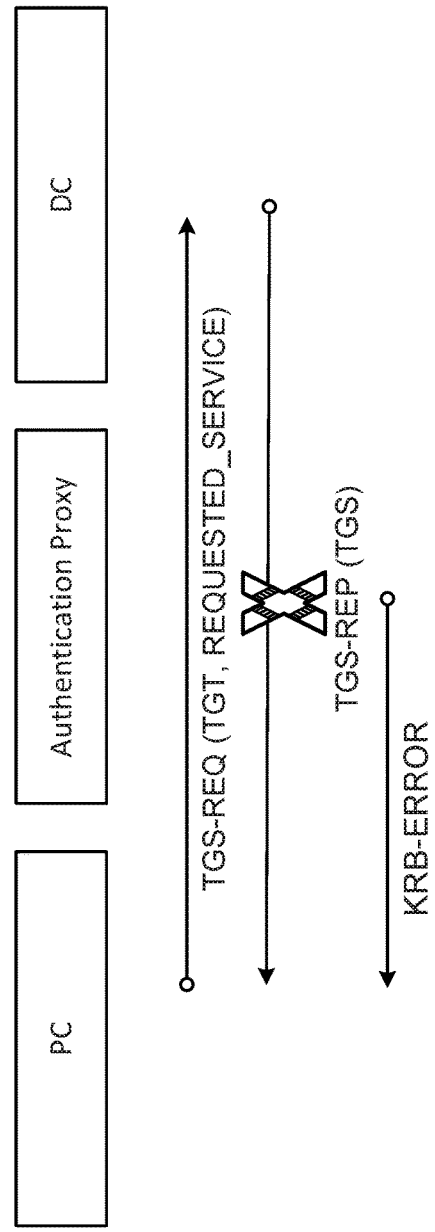

SYSTEM AND METHOD FOR PROVIDING AN IN-LINE SNIFFER MODE NETWORK BASED IDENTITY CENTRIC FIREWALL

PRIORITY CLAIM

This application is a non-provisional of, and claims priority to and the benefit of U.S. Provisional Patent Application No. 62/160,748, filed on May 13, 2015, which is incorporated by reference herein in its entirety.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

TECHNICAL FIELD

The present disclosure relates generally to systems and methods for preventing network-based intrusion into computer system resources, and relates more specifically to systems and methods for deploying an identity-centric firewall to ensure the security of an enterprise network using various techniques of detecting and responding to perceived attacks.

BACKGROUND

The notion of a "directory" in computer science can be conceptualized as a mapping between names and values, where the values can be looked up by name. In some situations, a directory can associate a particular name with multiple different values (i.e., pieces of information). These values may comprise many different types of data as is appropriate for a particular directory. Some examples of directories include a telephone directory in which a person's name is associated with values indicative of one or more telephone numbers, and a Domain Name System ("DNS") in which domain names are stored in association with IP addresses.

The computer science concept of directory services is also well-known. Pursuant to such directory services, a computer software system is provided that stores, organizes, and provides access to information in a computer operating system's directory. In known computer systems, directory services provide access to a database linking names with values indicative of computer operating system resources. Thus, a directory service in a DNS context is software that manages the database of relationships between domain names and IP addresses, and enables other resources to search for IP addresses associated with a particular domain name.

One particular, well-known directory service is known as Active Directory ("AD"). AD was developed by Microsoft® for use in its Windows® environment, and was included with Microsoft's Windows Server® operating system for use by developers of applications running in that environment. AD performs many tasks in this environment, including assigning and enforcing security policies for all computers and installing or updating software on Windows Server® computers. For example, when a user logs in to a computer in a Windows® domain, the AD service is responsible for checking the user's password and determining the user's level of access (e.g., whether the user is an administrator).

AD is a combination of a database of directories and a set of executable code for servicing requests. Objects in the database correspond to either resources such as printers or security principals such as user accounts. The database is organized into partitions holding specific object types. For example, a "Domain" partition holds all objects associated with a particular domain. The use of AD to provide for certain security principals is thus known in the art.

A security protocol named Kerberos is a well-known computer network authentication protocol. It operates on the concept of "tickets," whereby tickets are provided to nodes in a computer network to enable nodes to provide their identity to one another securely. One of the key concepts of the Kerberos protocol is the use of a "ticket-granting ticket" or TGT. TGTs are time stamped at a server node, contain the user's password, and are encrypted and provided to the workstation for storage. TGTs are provided relatively infrequently, and thus may only be renewed for example when a user logs in again. TGTs are used to facilitate communications with a client and a node in the network. At a high level, when a client wishes to access a node on the network, its TGT is sent to a ticket-granting service (TGS), which is a remote device from the client. The TGS verifies that the TGT is valid and that the user is permitted to access the requested service. If authorized, the TGS sends a ticket to the requested node for service, and the client can use the node as requested.

Despite the existence of these known services and protocols, a pressing need exists in the industry to provide security against unwanted or malicious access to computer resources on a network. The Kerberos protocol is helpful, but insufficient, to detect and prevent unwanted access to network resources. Prior attempts to remedy these deficiencies have involved placing firewalls either in-line (i.e., all network traffic passes through the firewall) or in a "sniffer" arrangement with (i.e., network traffic does not pass through the firewall, but certain traffic is analyzed passively) computer network elements. However, these efforts are also insufficient as they do not contain appropriate logic for determining when traffic is malicious or unwanted and reacting accordingly.

What is needed is a firewall solution that can operate in-line or in a sniffer arrangement that is capable of detecting malicious or unwanted network traffic with more reliability, and taking appropriate remedial action based on that traffic. The instant disclosure provides such a firewall solution and is referred to as an "Identity Centric Firewall" or "ICF".

SUMMARY OF THE DISCLOSURE

The instant disclosure is directed to an improved security system that relies on an Identity Centric Firewall (referred to herein as an "ICF") that resides in a computer network in front of a set of authentication servers to ensure that the security of the enterprise network is not compromised by an attacker. In various embodiments, the ICF is inline with identity and authentication servers, such that all network traffic between a remote device and the authentication servers (e.g., network traffic related to users authenticating themselves to the network or accessing resources) passes through the ICF. In other embodiments, the ICF operates in a "sniffer" mode in the sense that it selects a subset of traffic to analyze, but does not serve as a conduit through which all network traffic passes.

In various embodiments, the ICF performs the function of analyzing traffic from a remote client device to various server devices, including authentication servers, identity servers, access management servers, and the like. The disclosed ICF detects and prevents malicious or unwanted attacks on the network resources with which the authentication server is associated. In one embodiment, the ICF includes four modules: (1) the Traffic Extractor Module, responsible for extracting network traffic and deciding which traffic to analyze or ignore and let through, (2) the Detection Engine Module, which applies a set of rules to traffic determined necessary to analyze, (3) the Enforcement/Prevention module, which serves as an active proxy to enforce policies with regard to analyzed data determined to be potentially malicious or unwanted, and (4) the Management Module, which integrates rules and creates alerts to be provided to the system administrator or a third party management system. The details of these modules will be discussed in more detail below.

In various embodiments, the system disclosed herein is advantageous over known systems because it is able to dynamically respond to detected threats. Specifically, the disclosed system can store a plurality of rules and update those rules based on past experience. For example, if the disclosed system learns that network traffic between a certain set of hours is most often below a certain level, then it can update its rules to include a rule that detected network traffic above that level during that time period is abnormal. This ability to dynamically modify rules is unique, and improves over known firewall technologies, which are generally static in nature. The disclosed system recognizes that if it can learn normal network behavior, it can advantageously detect changes or abnormalities in that behavior and adapt with or without network intervention.

The disclosed system is also advantageous in that it has access to active directory information and therefore is more accurate and more able to provide rich feedback information to individuals monitoring protected computer resources. That is, the disclosed system constitutes an improvement over known firewall technologies because it relies on the intelligence of the protected resource's active directory and to help improve accuracy and adaptability. In some example embodiments, the disclosed system also constitutes an improvement over known firewall technologies because it collects user ID information from third parties including next generation firewalls, email security gateways, single sign-on systems, and the like. That is, the disclosed system is advantageous in certain embodiments because it collects user-specific information from various entities that store and maintain such information.

The disclosed system is also advantageous in various example embodiments because it relies on polymorphism. Specifically, in various embodiments, users of the disclosed system never see the TGT because the system scrambles it. In various embodiments, this scrambling occurs using a key of the day or other appropriate key, meaning that the organization also knows if a TGT is being misused. Accordingly, by providing this polymorphism, the disclosed system helps reduce or eliminate certain kinds of attacks discussed herein.

In various example embodiments, the disclosed system is also advantageous by virtue of being an inline solution. Specifically, the fact that the disclosed system may be (a) inline with network traffic being analyzed and (b) capable of receiving updated profile information defining the types of attacks being monitored and the responses to those attacks means that the disclosed system can operate as an enforcer for third-party sniffer-based solutions that don't have a way to enforce security policies. In some embodiments, the disclosed system provides an API or other interface to enable third-party systems to provide policy information and receive information about enforcement of the policy by the disclosed system in real-time.

In various example embodiments, the disclosed system also advantageously facilitates communication with single sign-on solutions independent of the active directory of the protected system. It also enables communication with solutions in the cloud, such as cloud-based authentication or cloud-based sign-on solutions, to ensure that users accessing the system are indeed authorized to do so. In these embodiments, the system can provide the cloud-based or other authentication services with necessary information about the users to enable enforcement of policies as desired.

In one embodiment, the disclosed system advantageously prevents security threats in real-time using the disclosed identity-centric firewalls. In this embodiment, the disclosed system dynamically adapts to changing network behavior, automatically protects compromised networks, and provides insights to continuously improve security.

In various example embodiments, the system disclosed herein advantageously provides users with visibility. Specifically, the disclosed system eliminates weaknesses by identifying users with weak passwords, stale accounts, shared endpoints, and the like. The system also provides for multi-dimensional user verification by instantly identifying credential theft, identifying pass the ticket attacks, challenging insider misuse, and leveraging third party data for user verification. The system can also provide effective threat management by providing policy-based security management, multiple responses including MFA, re-authenticate, notify, allow, block, and the like, and providing learning behavior that automatically adapts to changing user roles. Finally, the disclosed system can provide infrastructure protection by detecting golden tickets, pass the hash attacks, forged PACs, and stale service accesses. It can also notify upon new service access, can identify and protect against active directory harvesting, and can automatically identify malicious account lockouts.

In short, the disclosed system in various embodiments ties user identity and behavior to the organizational structure and asset value to effectively protect the enterprise. In these embodiments, it responds automatically to emerging threats, and provides insights to continuously improve enterprise security. The disclosed system in one embodiment is the next generation of firewalls that uses identity as its core to enable enterprises to secure their networks.

BRIEF DESCRIPTION OF THE FIGURES

FIGS. 4 to 11 are exemplary flows enabled by the system disclosed herein to detect and respond to potentially malicious network traffic.

DETAILED DESCRIPTION

Figure 1:
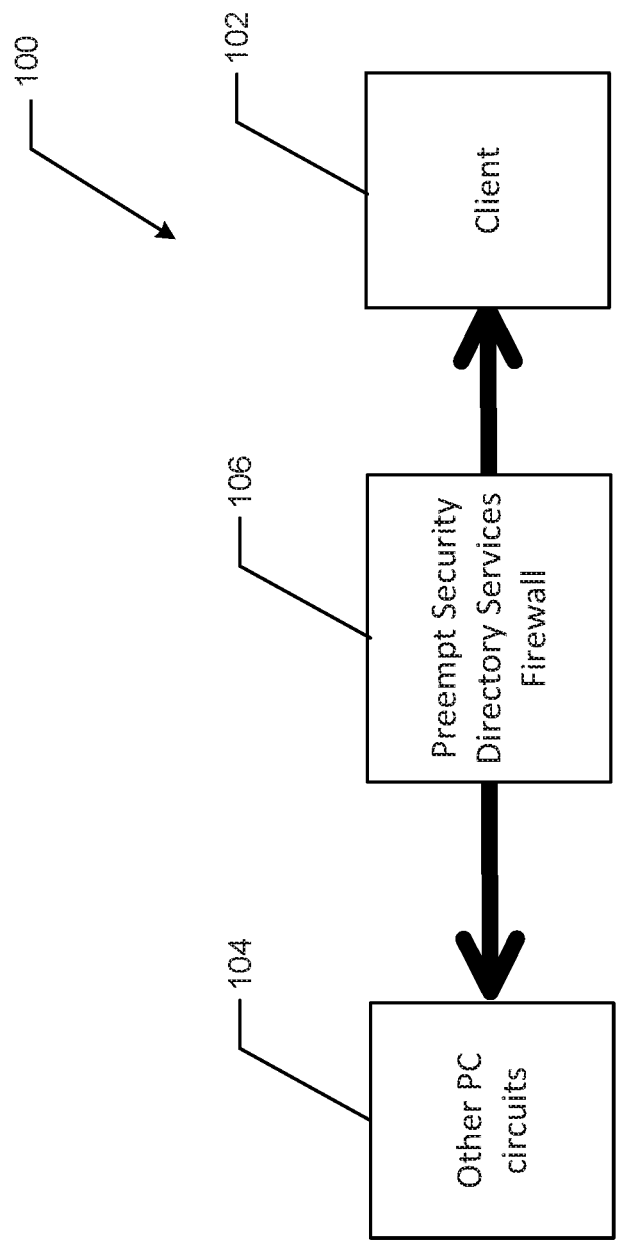
FIG. 1 illustrates a high-level network architecture diagram of an example embodiment of the system disclosed herein.

FIG. 1 illustrates a high-level network architecture diagram of an embodiment of the system disclosed herein. In the embodiment of FIG. 1, the system 100 includes three generic types of components. First, the system includes a plurality of client devices 102 used by remote users (known or unknown) to access the system. As illustrated, these client devices 102 can include servers, cloud-based services, personal computers/laptops, tablets, smartphones, or any other appropriate computing device from which a client may access the system.

The system 100 additionally includes a protected server 104 which contains the data and/or services the users at the client devices 102 are attempting to access. For example, the protected server 104 may be running Microsoft® Windows Server® software to host various server-based services, such as word processing services, document management services, and the like. It should be appreciated that the particular services hosted on the protected server 104 are in general not germane to the system and methods disclosed herein. In various embodiments, the protected server 104 includes at least an authentication service through which users at client devices 102 can provide authentication information (e.g., a user name and password) and be authenticated to the protected server 104 to access its various services. In this embodiment, one or more directory services, such as Active Directory ("AD"), provides authentication services through which users are authenticated based on input information.

Finally, the system 100 includes an Identity Centric Firewall ("ICF"), labeled in FIG. 1 as item 106. In various embodiments, the ICF provides for the security methods and protocols discussed in more detail below. As will be discussed, the ICF may either be inline (as illustrated in FIG. 1), meaning that all network traffic must pass through the ICF, or may operate in "sniffing" mode in which traffic passes directly from the protected server 104 to the client devices 102, with the ICF determining some but not all of the data to analyze. In various embodiments, the ICF disclosed herein ensures that the security of an enterprise network, such as the network represented by protected server 104, is not compromised by an attacker or other unwanted user of the system. Various techniques have been developed to detect and prevent these kinds of attacks; these techniques are discussed in more detail below.

Figure 2:
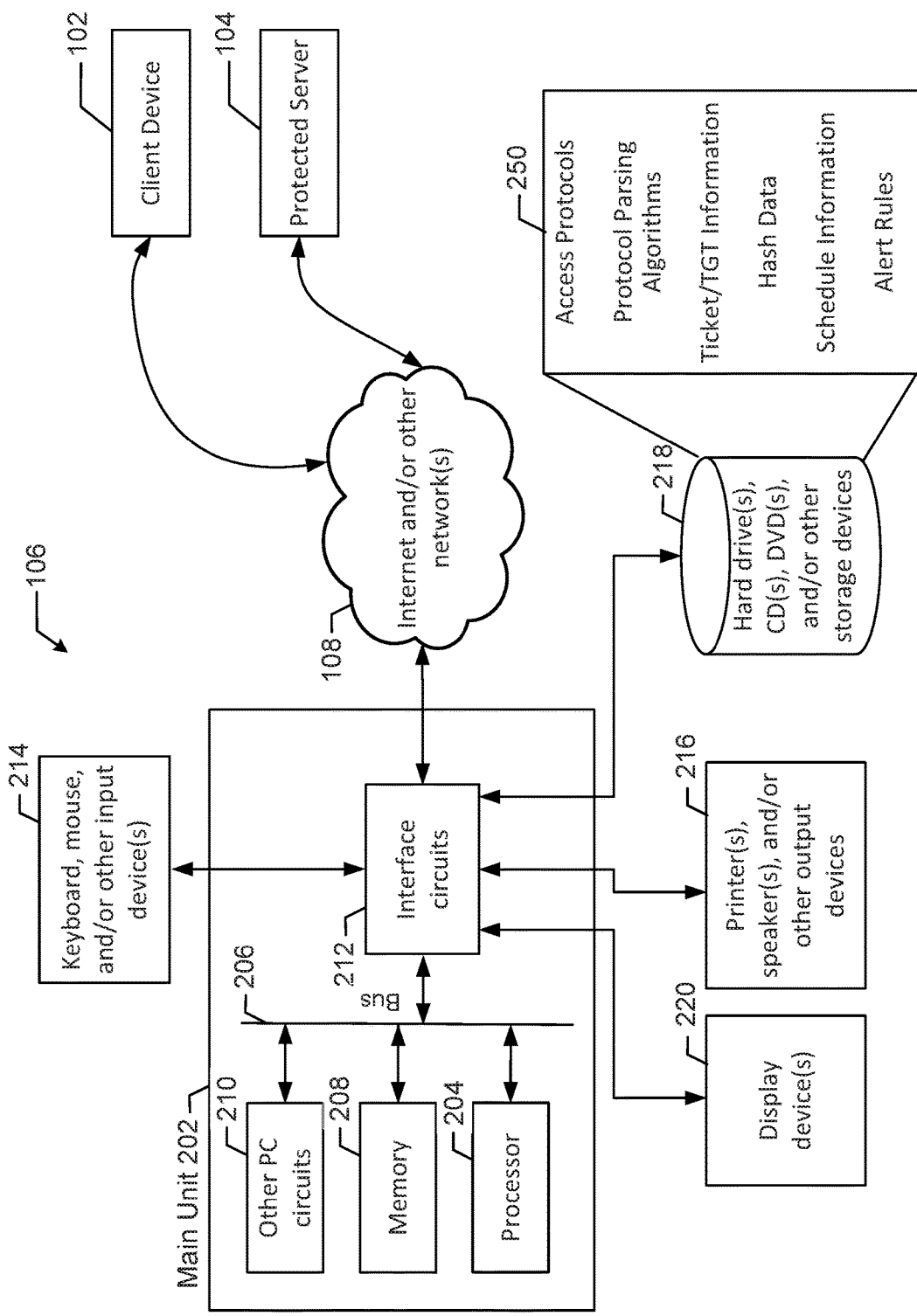
FIG. 2 is a block diagram illustrating an example of the electrical systems of a device usable to implement the Identity Centric Firewall functionality disclosed herein.

FIG. 2 illustrates an exemplary computer architecture for a machine running software to implement the ICF discussed above with regard to FIG. 1 and discussed in more detail below. The instant disclosure is directed to an improved security system that relies on an Identity Centric Firewall (referred to herein as an "ICF") that resides in a computer network in front of a set of authentication servers to ensure that the security of the enterprise network is not compromised by an attacker. In various embodiments, the ICF is inline with the authentication servers, such that all network traffic between a remote device and the authentication servers (e.g., network traffic related to users authenticating themselves to the network) passes through the ICF. In other embodiments, the ICF operates in a "sniffer" mode in the sense that it selects a subset of traffic to analyze, but does not serve as a conduit through which all network traffic passes.

FIG. 2 is a block diagram illustrating an example of the electrical systems of a device (e.g., computer device 106) usable to implement the ICF system functionality described herein. In one embodiment, the device 106 illustrated in FIG. 1 corresponds to a server device that operates as an Identity Centric Firewall to protect a protected server 104 against harmful or unwanted access by users at one or more client devices 102. In this embodiment, the generic computer architecture illustrated for device 106 in FIG. 2 can also illustrate the computer architecture for either the client devices 102, the protected server 104, or both. It should be appreciated that in this embodiment, the hardware components may match those illustrated in FIG. 2, but the data stored in, for example, the hard drive 218 (discussed in detail below) may vary depending on which device the architecture is being used to describe. If, for example, the diagram of FIG. 2 is being used to represent client device 102, the hard drive 218 may store, for example, web browser software through which the user accesses the system. Similarly, if the diagram of FIG. 2 is being used to represent protected server 104, the hard drive 218 may store, for example, operating system software that the user at the client device is attempting to login to.

In the example architecture illustrated in FIG. 1, the ICF device 106 includes a main unit 202 which preferably includes one or more processors 204 electrically coupled by an address/data bus 206 to one or more memory devices 208, other computer circuitry 210, and/or one or more interface circuits 212. The one or more processors 204 may be any suitable processor, such as a microprocessor from the INTEL PENTIUM® or INTEL CORE™ family of microprocessors. PENTIUM® and CORE™ are trademarks of the Intel Corporation and each refer to lines or families of commercially available microprocessors.

In one embodiment, ICF device 106 includes memory 208. Memory 208 preferably includes volatile memory and non-volatile memory. Preferably, the memory 208 stores one or more software programs that interact with the hardware of the ICF device 106 and with the other devices in the system as described below. In addition or alternatively, the programs stored in memory 208 may interact with one or more client devices such as client device 102 and/or one or more protected servers such as protected server 104 to analyze and determine whether access is malicious, and if so, to take appropriate action to prevent access and/or provide the appropriate alerts regarding the determined malicious access attempt. The programs stored in memory 208 may be executed by the processor 204 in any suitable manner.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system. In one embodiment, wherein the ICF device 106 is designed to be operated or interacted with only via remote devices, the ICF device 106 may not include input devices 214.

One or more displays 220, printers, speakers, and/or other output devices 216 may also be connected to the main unit 202 via the interface circuit 212. The display 220 may be a liquid crystal display (LCD) or any other type of display. The display 220 generates visual representations of data during operation of the ICF device 106. For example, the display 220 may be used to display information about the determination of whether attempted access is malicious or unwanted, to review historical data about determinations of malicious activity, and/or to display an administrator interface to enable an administrator to affect the methods employed and algorithms used to detect malicious access attempts.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the ICF device 106, including rules or policies regarding determining malicious access attempts and responding thereto, as well as the additional types of data indicated in block 250. Alternatively, storage devices 218 may be implemented as cloud-based storage, such that access to the storage 218 occurs via an internet circuit such as an Ethernet circuit 212.

In one embodiment, this connection of devices (i.e., the ICF device 106 with client device 102 and/or protected server 104) is facilitated by a network connection over the Internet and/or other networks, illustrated in FIG. 2 by cloud 108. The network connection may be any suitable network connection, such as an Ethernet connection, a digital subscriber line (DSL), a WiFi connection, a cellular data network connection, a telephone line-based connection, a connection over coaxial cable, or another suitable network connection.

In one embodiment, ICF device 106 is a device that provides security services, including data traffic analysis and access prevention, as appropriate for the analyzed traffic. In this embodiment, the specific hardware details of ICF device 106 are not important to the implementer of the disclosed system-instead, in such an embodiment, the implementer of the disclosed system utilizes one or more Application Programmer Interfaces (APIs) to interact with client devices 102 and protected server 104 in a convenient way, without regard for the particular hardware underlying the ICF device 106. In another embodiment, the ICF functionality described herein is provided using hardware of the protected server 104 itself, and the ICF device 106 is a virtual machine running in the same hardware environment as the services and information on the protected server 104.

Access to ICF device 106 and/or protected server 104 may be controlled by appropriate security software or security measures. An individual user's access can be defined by the ICF device 106 and limited to certain data and/or actions, such as certain administrative activities on the device 106, according to the individual's identity. Accordingly, users of the system may be required to register with the ICF device 106 before performing administrative tasks with regard to the ICF functionality facilitated by the system.

In one embodiment, client device 102 is a third-party security device that is relying on the disclosed system to enforce its security policies. For example, in these embodiments, client device 102 may interface to the disclosed system to (a) provide policy information indicative of desired security policies to enforce and (b) receive data regarding the enforcement of these policies. In this embodiment, the system disclosed herein operates as an enforcer, enforcing policies desired by third-party systems and reporting on the enforcing. In other embodiments, the client device 102 may not provide policies but instead may indicate when it determines data to be indicative of an attack; in this embodiment, the system disclosed herein responds appropriately (e.g. by terminating a connection to the source of the malicious data) but does not actually determine that the data is indicative of malicious activity.

In various embodiments, ICF device 106 and/or protected server 104 as illustrated in FIG. 2 may in fact be implemented as a plurality of different devices. For example, the ICF device 106 may in actuality be implemented as a plurality of server devices operating together to implement the protection and alerting functionality described herein. In various embodiments, one or more additional devices, not shown in FIG. 2, may interact with the ICF device 106 to enable or facilitate this detection and protection functionality. For example, in one embodiment the ICF device 106 communicates via network 108 with one or more public or private repositories of information, such as rules for detecting attempted malicious activity or databases of potential passwords available to hackers, as data stores usable by the ICF device 106 to detect and prevent malicious access to protected server 104.

Figure 3:
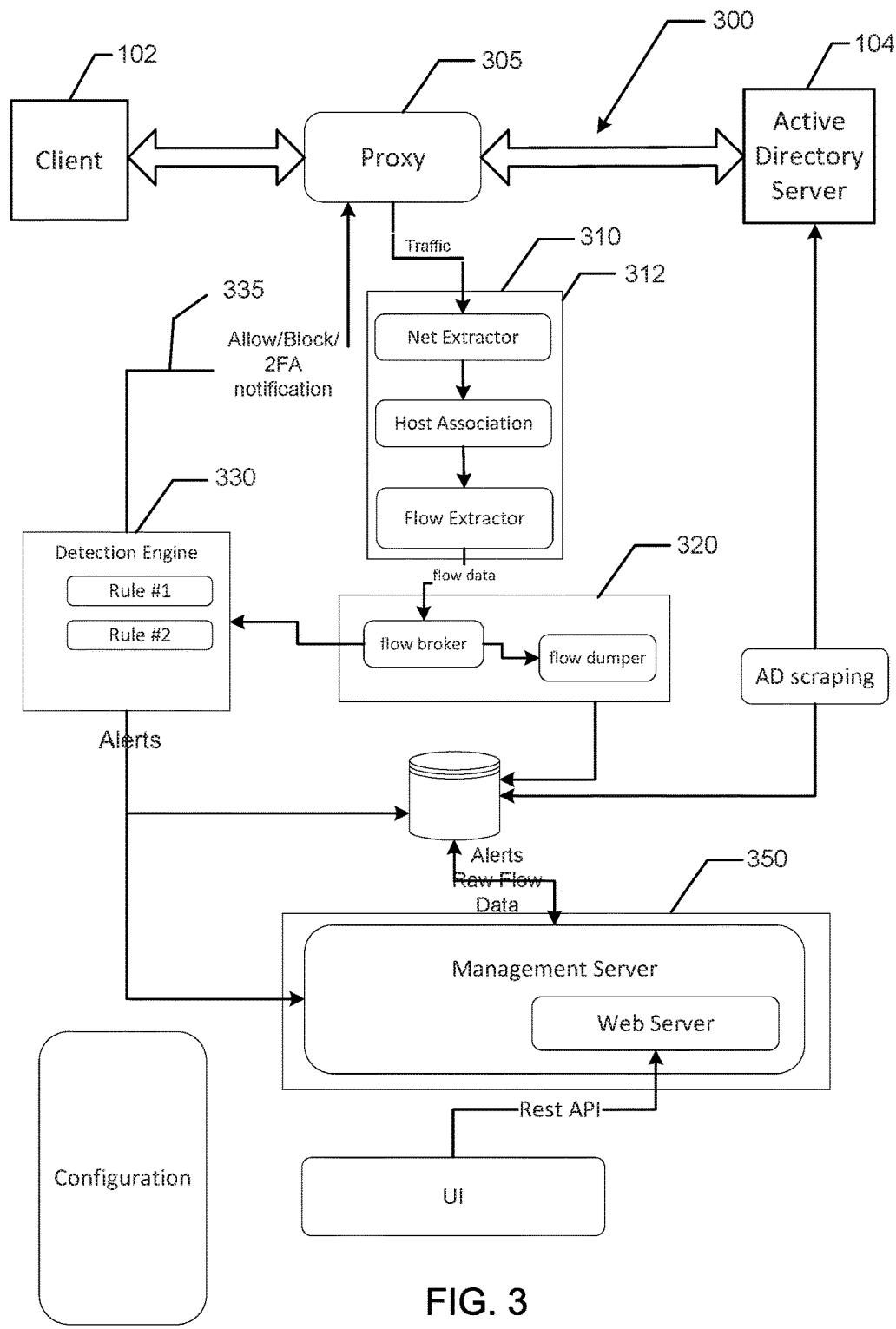
FIG. 3 is an illustrative architectural/flow diagram of one embodiment of the system disclosed herein.

FIG. 3 is an illustrative architectural/flow diagram of one embodiment of the system disclosed herein.

In one embodiment, the system 300 disclosed herein includes a Traffic Extractor Module that is responsible for extracting network traffic, deciding what traffic to analyze and which traffic to ignore (i.e., when operating in sniffer mode) or let through the system (i.e., when operating in inline mode). In the embodiment of FIG. 3, the Traffic Extractor module is included in the "Proxy" box 305. The Proxy 305 may be an in-line intermediary or a traffic sniffer between a client 102 and an active directory server 106 as illustrated. This box includes the proxy capabilities of the disclosed system in the sense that it receives and sends messages on a tunnel between the unprotected part of the network and the protected network components. Box 310, which receives data extracted by Proxy 305 for further inspection and analysis, includes a net extractor sub-module, a host association sub-module, and a flow extractor sub-module.

In one embodiment, the Traffic Extractor Module performs a traffic analysis process to perform its function of analyzing traffic to determine whether to ignore/let through to the system. In this embodiment, when the ICF is operating in either sniffer or inline mode between the enterprise network and the authentication servers (for example, servers running Microsoft®'s Active Directory Service), many different protocols are used between network entities and protocols are used between the different networks entities and the domain controllers ("DCs") running Active Directory. Exemplary protocols for this communication include the Microsoft® Kerberos 5 protocol, which those of skill in the art understand is based on the Massachusetts Institute of Technology Kerberos protocol (see, e.g., http://tools.ietf.org/html/rfc4120). In other embodiments, the communications protocols that can be used for this communication include the Lightweight Directory Access Protocol ("LDAP") (see, e.g., http://tools.ietf.org/html/rfc4511) or the Microsoft® Remote Procedure Call ("MS-RPC"), (see, e.g., http://technet.microsoft.com/en-us/library/cc759499 (v=ws.10).aspx), and other suitable protocols.

In one embodiment, the ICF processes the above-noted protocols according to public specifications to build network messages that describe the TCP/IP or UDP/IP communications between entities in the network. In one embodiment, this process is performed by a module referred to as a NET Extractor, which is labeled as item 312 in the embodiment of FIG. 3. In one embodiment, the NET Extractor not only builds NET messages but also combines these messages into single NET protocol messages that can be parsed and processed. In the presently preferred embodiment, each NET message created by the NET Extractor 312 includes a 5-tuple that is responsible for identifying the source and destination of the NET message. Specifically, since every TCP or UDP connection between two hosts are uniquely identified by the following 5-tuple including: Protocol (UDP, TCP), IP-address of Host A, Port number of Host A, IP-address of Host B, and Port number of Host B, NET Extractor 312 in one embodiment includes the 5-tuple for that TCP/UDP connection.

In one embodiment, after the creation of the NET messages, the ICF system disclosed herein forwards the created NET messages to a FLOW factory component, referred to in FIG. 3 as box 320. As used herein, the phrase "FLOW" refers to messages constructed from the network messages described above. In one embodiment, the FLOW factory is built using a publish/subscribe pattern that allows FLOW data to be generated using received NET messages. In one embodiment, each network operation could be classified as a high-level network FLOW.

Each FLOW in one embodiment consists of multiple NET messages that can be source of different protocols, which unite into a single FLOW between a network entity and the Active Directory Service. This unique association of protocol messages to actual and meaningful flows allows better inspection and anomaly detection. In a further embodiment, the FLOW factory can generate FLOWS that are based on other FLOWs and not just NET messages.

In various embodiments, the inspected FLOWs that can be created in the disclosed system include one or more of the following:

(a) Kerberos TGT generation FLOW—FLOW indicative of the process of creating a Ticket Granting Ticket by sending AS-REQ and receiving AS-REP messages over the Kerberos protocol between the entity and the KDC (b) Kerberos TGS generation or Service Access FLOW—FLOW indicative of the process of a domain user account accessing a network resource (LDAP, Terminal Server, File Server, etc.) which results in creation of a TGS (Ticket Granting Service) by sending TGS-REQ and receiving TGS-REP messages over the Kerberos protocol between the entity and the KDC (c) Login FLOW—FLOW indicative of the process of a domain user account logging in to a computer (interactively or remotely) by sending multiple Kerberos messages to obtain TGT and TGS, and also LDAP that queries for domain and domain controller parameters and MSRPC that negotiates the actual login procedure within the Windows network (d) LDAP FLOW—the LDAP protocol provides the system with the option to access the Active Directory Service and query for the structure of the directory that includes the different domains, organizational units, groups and finally computer and user accounts. This protocol could be encrypted using session keys generated by authentication protocols (Kerberos/NTLM), which means that only part of the time the actual contents of the protocol can be parsed and processed. By using the amount of data transferred in a single flow we can detect the probability of this flow being malicious.

In further embodiments, additional FLOWs that could be provided by the system disclosed herein include FLOWs related to a computer powering on, a computer logging off, a user changing a password, and a new computer being added to the domain.

In one embodiment, the system disclosed herein includes a Detection Engine Module illustrated in FIG. 3 as block 330. In various embodiments, the Detection Engine Module is responsible for detecting malicious or abnormal behavior and taking appropriate action, such as by allowing or blocking traffic and/or generating one or more alerts as appropriate.

In various embodiments, malicious detection features of the system disclosed herein are generated by a combination of deterministic and behavioral methods. In the embodiments discussed herein, these features are referred to as "Rules", including "Rule #1" and "Rule #2" illustrated in block 330 of FIG. 3. In various embodiments, Rules can be deterministic and/or probabilistic. The number of Rules in the system that is enabled at any time can be automatically determined or manually selected. In various embodiments, the disclosed system enables system administrators to control which rules are currently being applied in the network. The following description outlines exemplary Rules usable by the ICF disclosed herein Pass the Ticket The Pass the Ticket Rule was first presented by white hat hackers several years ago and has proven to remain effective today. This is believed to be because of the design of the Kerberos protocol. Despite Active Directory providing a method to prevent this type of attack, it nonetheless occurs in known systems and such known systems are vulnerable to this kind of attack. Moreover, because this type of attack is configuration dependent, misconfigurations and allow-based policies on Active Directory systems can open up such systems to this kind of attack.

In one embodiment, the system disclosed herein detects Pass the Ticket attacks can be by detecting when the same TGT is used by two different computers. In one embodiment, the disclosed system recognizes an exception to Pass the Ticket representing a malicious attack in which user/computer accounts are configured such that unconstrained delegation is allowed in the Active Directory. In that scenario, a ticket will indicate that is being used from a different computer than the one on which it was originally created. In this case, the disclosed system handles the exception described by using Active Directory analysis to detect which computer accounts can use the delegation services; the disclosed system in this embodiment does not generate alerts or take other action in the event the TGT is associated with such computers. In a further embodiment, the disclosed system determines prior to a delegation attempt that a particular ticket for a delegation-enabled computer has been generated, and stores an indication of that ticket. When such a ticket is detected, the activity is allowed.

Golden Ticket

In an embodiment, the disclosed system is configured to detect and handle a so-called Golden Ticket type of attack, described in the publication available at the URL http://cert.europa.eu/static/WhitePapers/CERT-EU-SWP_14_07_PassTheGolden Ticket v1 1.pdf. Under this type of attack, a user generates a so-called Golden Ticket, which is a forged TGT. Generating such a Golden Ticket enables the user to grant itself, or even a fake user, any permissions desired and may set any expiration date desired. In an embodiment, generation of such a Golden Ticket is enabled by one-time access to the domain controller or Windows server machine running the Active Directory Service, which may be sufficient to retrieve KRBTGT (a special hardcoded username in Active Directory whose password (hashed) is used as the master password), the domain's KRBTGT account, which is the account password used as master key in the Kerberos KDC component. Access to this information in one embodiment enables a malicious user to generate a valid, albeit forged, TGT (i.e., the "Golden Ticket").

In one embodiment, the system disclosed herein detects Golden Tickets and reacts to them using an appropriate Rule. Specifically, in this embodiment, the ICF system monitors for the used tickets on the network traffic and determines the last time the tickets were renewed. In the Golden Ticket situation, because such a ticket generally does not require renewal, the system will determine that a ticket is suspicious and a potential "Golden Ticket" if it has been used for a relatively long period of time, such as 10 hours. In another embodiment, the Rule to handle the Golden Ticket situation determines which TGTs were not generated by one of the DCs in the network, and determines that such tickets are more likely to be Golden Ticket attacks. It should be appreciated that this detection method may be most relevant when a full domain coverage is available.

Pass the Hash/Credential Theft

In one embodiment, the ICF system disclosed herein is configured to respond to the so-called "Pass the Hash/Credential Theft" attack, which is a well-known attack technique described at the following URL: http://www.rsa-conference.com/writable/presentations/file upload/hta-w03-pass-the-hash-how-attackers-spread-and-how-to-stop-them.pdf. This hack can be used to grant access to network resources based on the password hash of a victim account. In this attack, an attacker steals a password hash from the credential store in Windows machines. In order to generate malicious access to the resources, an attacker might use the hash to connect to network resources using NTLM or an attacker can use the Kerberos protocol to impersonate the user entirely from a different machine in the network. The attacker might also use the hash in NETLOGON authentication. In addition, in the case of Pass the Hash or credential theft, the first action of an user from a certain machine has to be a login to that machine. The login traffic has specific features, and so, it would generate a corresponding login flow. If any other action is being carried out before the login flow is carried, this action might be of an attacker that stole the user credentials (or the password hash). This might apply to service accounts, but those have some unique features that make it distinguishable and therefore possible to whitelist.

In one embodiment, one of the Rules implemented by the disclosed system is configured to detect and handle Pass the Hash/Credential Theft type attacks. In this embodiment, the system recognizes that Pass the Hash is similar to password theft, which means that there are no techniques to distinguish between the two based on the protocol layer. Accordingly, Rules in the disclosed system monitor user account activity to try to determine when the attack is being mounted. In one embodiment, the disclosed system monitors and tracks the usage patterns of specific user accounts based on a source account retrieved from the Kerberos TGT generation flow. In this embodiment, the computer that originated the TGT generation flow is associated with the source account and the TGT, and is then processed in kept for later analysis. After the learning phase, where enough samples are collected to determine the computers that are being used by every user the in the organization, misuse alerts can be generated on activity that the disclosed system determines to be abnormal (or sufficiently abnormal) for users that generate traffic from computers that do not match the learned baseline.

Working Hours

In one embodiment, the disclosed system implements one or more Rules related to user working hours may help you recognize an attacker breach inside the enterprise network. These Rules seek to detect activity that is inconsistent with a user's typical working hours, and makes use of the presumption that most attacks occur at a time that the network is less busy with IT/security teams personnel. In an embodiment, the disclosed system implements one or more Rules that learn the baseline patterns of user/computer working hours, and thereby identifies off hours for user/computer combinations. The disclosed system recognizes that in some instances seemingly anomalous behavior may not represent an attack (e.g., a user accessing a network from outside the network via a VPN), but Rules nonetheless flag network entities (IP addresses) in order to build a history of expected or normal VPN address ranges, and generates alerts or takes other action when IP addresses are not from the expected set.

Abnormal Service Access

In many attack scenarios, after malware infects a specific computer, it tries to access multiple resources on the network to get access to target organization IP. In addition, service access can identify lateral movement inside the organization network, when the attacker gets hold and access to key components in the network and eventually gets access to the entities that hold his desired IP data. These types of activity are at their root abnormal service access requests, and indicate attack type activity.

In one embodiment, the system disclosed herein includes Rules to deal with such abnormal service access situations. In this embodiment, the system monitors and stores (i.e., learns) access patterns between users and services (while service runs on a target computer) to establish a baseline for every user over time. After the learning phase, new or many services accessed by a user could raise an indicator of malicious behavior. As discussed above, in some situations this behavior is not malicious; nonetheless, detecting an anomaly at least enables an alert to be generated and an IT specialist to investigate.

Bandwidth Detection (Automation)

In various embodiments, attacks are mounted using automatic scripts that try to traverse the network, by creating abnormal bandwidth traffic associated with authentication protocols (Kerberos, NTLM, etc.). Some attacker implants use automated (usually time-based) methods to move their "products" (i.e., intellectual property such as code or login credentials stolen from the organization) around before exfiltration to the Command and Control network. The idea of such trafficking of intellectual property is that moving the intellectual property between different entities in the network before sending them over the internet to the attacker's server avoids exfiltration detection from sensitive entities in the organization. That is, attackers attempt to move the data to a less sensitive entity within the network and then export it to their own system over the internet. In such a scenario, the network sees files being moved between different computers to allow centralized exfiltration in the case of an organization that does not have a direct link to the internet from all the computers or distributed exfiltration where the attacker seeks to avoid passing the thresholds in the organizational internet proxy. In addition, various mechanisms including automated attacker scripts might appear to the system to be automation tasks running on the enterprise network executing administrative tasks between the different entities in the network. Those automated tasks are executed using service accounts.

In one embodiment, Rules in the disclosed ICF system learn characteristics of normal bandwidth and automation by watching for access from specific accounts (user/computer) to specific services, and watching the time pattern for those flows. The disclosed system seeks to identify patterns of an automated script, meaning that it is possible to detect malicious out-of-order flow.

Active Directory Harvesting

Pursuant to a technique known as "Active Directory Harvesting", an attacker seeking to breach an enterprise network by learning its structure and key components (e.g., domain controllers, domain administrator accounts, etc.). To achieve this goal, attackers may seek to get access to the AD structure. In many systems, this can be done by any authenticated user in the network by querying for full Active Directory structure using the LDAP protocol. Knowing about the Active Directory is a basic approach for understanding the structure of the organization and the relevant security/mail groups related to the administrative positions inside the network. Once obtained, this information can often be used by the attacker to infiltrate privileged users and computers to get access to IP data. In such an attack, is may be possible to restrict access (hide) for some users to retrieve the contents of specific objects, but not every network administrator configures that feature, and the default is that every authenticated user can list/view all objects.

Rules in one embodiment of the disclosed system attempt to detect Active Directory Harvesting and take appropriate actions based on detected activity. For example, while LDAP access may be partially encrypted, it may nonetheless be possible to understand that the traffic is LDAP oriented and to measure the amount of LDAP traffic moving between entities in the organization network. After a sufficient amount of time monitoring this type of traffic, Rules in the system attempt to create a baseline amount of LDAP traffic is learned for different entities. Using this baseline as a comparator, the disclosed system attempts to detect abnormal LDAP activity and issue appropriate alerts or take other action.

LDAP Modification

Under a so-called LDAP Modification attack, an attacker may attempt to modify AD configuration to access relevant network resources for malicious needs (e.g., file servers, or protected data storage systems like Sharepoint). This may be successful due to the fact that Active Directory controls not only authentication in Windows networks, but it also allows authorization for various network resources to allow/restrict access to their data using user- and group-based authentication (using the LDAP protocol). The LDAP protocol allows modification to the Active Directory structure (user or group modifications) using different commands. An attacker could modify objects in the AD to help his lateral movement needs between the different network resources inside the organization.

In an embodiment, the disclosed system includes Rules for detecting this LDAP Modification type of attack. Specifically, when monitoring LDAP activity towards the Active Directory Service instance, the disclosed system can detect in real time modifications to sensitive entities like privileged users and groups. Real-time monitoring of this type provides live notification of possible changes to the structure or attributes of the sensitive entities, versus AD polling and comparison to historical information. In this embodiment, when the LDAP commands are encrypted, it is possible to use LDAP modification commands as triggers for checking inconsistency in the AD structure, especially for sensitive entities.

Password Brute-Force

Under a so-called Password Brute-Force attack, a group policy may permit such an attack due to lockout policy overhead (user gets locked, calls help desk for supports, help desk resets the user password). Active Directory helps to support the lockout policy overhead by allowing automatic lockout expiration after some unsuccessful login attempts. In this situation, password brute-force can happen by simple mistakes or by a sophisticated attacker that tries to get access to privileged accounts based on lists of passwords. The password list consists from commonly used password combinations. Those passwords can be used to apply brute-force attack on privileged accounts in the organization. In addition, organizational IT/security passwords can be common, which means that when an attacker obtains access to a single password, additional user accounts in the domain organization can be exploited to gain access to sensitive data in the organization.

In an embodiment, Rules implemented by the disclosed system detect User-based and Password-based Brute-Force type attacks. Specifically, in this embodiment, when the lockout policy is disabled, automatic password brute-force detection is essential and unique as a method to detect an attacker inside the enterprise network. Detection in this embodiment may be based on number of failed attempts to negotiate a password (Kerberos TGT generation flow in which when the password is incorrect, the Kerberos TGT generation flow fails and thus determines that the password is bad).

Suspicious User Location

In modern corporate embodiments, where bring-your-own-device ("BYOD") is often supported by corporate IT organizations, many employees in enterprise have smartphones, tablets, or other personal devices provisioned with the company's applications. In order to protect the company IP, these personal devices frequently have their security configuration managed by the organizations (MDM) to allow for better control of the company IP in the case of a phone theft. It is also possible to connect the phone as component in the authentication/authorization process with the network, by using the above described access to determine user location when it tries to access network resources, it is possible to identify stolen/misused credentials in this method. It is also possible to tell where the phone is located using Wi-Fi/network based positioning, without querying for the actual user location (Cell ID/GPS).

Rules in one embodiment of the disclosed system use a connection to the MDM operator in the organization to query for the phone whereabouts and prevent access to some resources if the phone is unavailable in a particular geographical location, such as in the organization's physical premises. In this embodiment, when there is a mismatch between user activity and its' location (excluding VPN scenarios), it is then possible to detect abnormal activity.

In various embodiments of the disclosed ICF system, a so-called Enforcement/Prevention Module, illustrated as the data flow line 335 in FIG. 3, provides for an active proxy in the path of the network traffic to the AD server. Providing such an active proxy provides for several advanced enforcement actions not previously available, alone or in combination, in firewall systems. In embodiments of the disclosed system, enforcement actions to take in particular situations are provided as policies in the management system. In such embodiments, the system can automatically generate policies, and responses can be manually configured in the management system interface as will be described in more detail.

In one embodiment, the disclosed system enables real-time termination of suspicious connections. In this embodiment, because the disclosed system has access to the protocol layer between the network entities and the Domain Controller, the system can cause the termination of connections (authentication/authorization sessions) by responding with protocol error messages that cause such terminations and thwart attempts of attackers to infiltrate the system. This prevention method might be more difficult to handle due to major experience on the affected user accounts. For this enforcement method, in various embodiments, a helpdesk may be required to handle (whitelist) the affected users/services to allow continuous work despite such terminations of connections.

FIG. 4 illustrates a normal authentication flow in one embodiment of the disclosed system. In this flow, and as illustrated, the user sends a Kerberos AS-REQ to the domain controller, asks for TGT to be able to access network resources (login the computer, access files on the file server, etc.), and provides the current timestamp encrypted with the hash of his password. Thereafter the domain controller approves and sends back the TGT for that user with authorization data provided.

When monitoring this communication, the disclosed system can extract the username along with details about the computer that tried to authenticate (e.g., its IP address, MAC address and hostname provided in the Kerberos protocol). According to this information the detection engine described earlier analyzes the traffic and generates real time actions, such as session terminations, to prevent this suspected malicious attacker from continuing the suspicious activity.

FIG. 5 hereto illustrates a blocked authentication flow. In this flow, and as illustrated in FIG. 5, the user sends a Kerberos AS-REQ to the domain controller, asks for a TGT to be able to access network resources (e.g., to login the computer, access files on the file server, etc.), and provides the current timestamp encrypted with the hash of his password. Thereafter, the authentication proxy detects potentially malicious user activity and stops the authentication flow by sending KRB-ERROR to that user.

In one embodiment, the system disclosed herein also provides for responses to detected malicious activity by preventing access to certain services by potential malicious users. In this embodiment, the disclosed system enables the definition of specific strong policies that will block suspicious user access from access to specific services in the network. This will minimize the amount of effect on the user experience in the event the behavior is not actually malicious, because not the entire user access will be restricted, but the user will be limited with access to the pre-chosen highly sensitive organizational resources.

FIG. 6 illustrates a normal service authorization flow. In this flow, and as illustrated in FIG. 6, the user sends a Kerberos TGS-REQ to the domain controller, asks for TGS to access specific network resource, provides the prerequisite TGT, and provides the requested network resource (service). Thereafter the domain controller approves and sends back the TGS for that user to the specific network resource with the authorization data provided. When monitoring this communication, the system disclosed herein matches TGT-TGS combinations to generate user-to-service access matching information along with the details about the computer that tries to get access to the specific resources on the network (IP address, MAC address and hostname provided in the Kerberos protocol). In one embodiment, the disclosed detection engine can analyze this traffic and generate real-time session termination actions in order to prevent this suspected malicious attacker.

FIG. 7 illustrates a blocked service access authorization flow. In this flow, and as illustrated in FIG. 7, a user sends a Kerberos TGS-REQ to the domain controller, asks for TGS to access specific network resource, provides the prerequisite TGT, and provides the requested network resource (service). Thereafter, the authentication proxy detects malicious user or service activity and stops the service access authorization flow by sending KRB-ERROR to that user.

In one embodiment, the disclosed system responds to detected attacks or other malicious activity by disconnecting the subject terminal from the network. In this embodiment, it is possible to actively connect to some network management system and disconnect the computer from the enterprise network, by blocking it's network connectivity based on its MAC or IP address or actual physical network port using network management and control software (routers, switches, classic or next-generation firewalls, etc.). When appropriate, the disclosed system takes this activity to ensure no further malicious activity occurs.

In various embodiments, when the disclosed system determines that potentially malicious activity is occurring, it implements a multi-factor authentication scheme to confirm the identity of the individual associated with the potentially malicious activity. In general, simple single-factor authentication is based on a user entering a correct password. This password is used for identity verification and can be easily stolen by another person/malware and thereafter used to impersonate the user. Multi-factor authentication schemes may rely on (a) smart-card based authentication, whereby instead of using a password, the certificate from the smart-card is used for the Kerberos authentication or (b) Microsoft® DirectAccess, which allows two-factor authorization of login to a Windows VPN product. Currently, however, Microsoft Active Directory cannot be extended to support additional features like the multi-factor authentication features discussed above, particularly because of backward compatibility and also due to the need to connect to additional components in the network. The following approaches can overcome this limitation of current DA-based systems.

In one embodiment, two-factor authentication functionality can be provided in the disclosed system by using an external device. In this embodiment, the disclosed system communicates a notification to the user that two-factor authentication is required. This notification can be communicated in different ways. In general, the disclosed system can notify users of the need for two-factor authentication using an (a) agent-based notification to a software that is installed on the device trying to access (b) second device notification via an organizational mobile application or existing protocols like SMS for mobile devices. This notification requires the user to provide a second form of authentication using, for example, an external device (e.g. app on the mobile device). In this embodiment, the second device or notification techniques should be authenticated in different methods (for example, using a mobile device for the second authentication assures that the user has physical access to the mobile device).

During that process, sending Kerberos error messages, like KRB_TKT_EXPIRED, would cause the client to retry and would allow the disclosed system to further delay the process by discarding Kerberos requests that are sent to the DC. The delay time and number of retries can be set using registry values. In the default configuration, more than one minute of delay is achievable. If, during this time, the user authenticates itself successfully in the external device, the next request would be delivered to the DC, and thus the authentication would succeed. In any other case, the authentication process would fail on the conclusion that the user was unable to authenticate himself or herself and therefore was an attacker/malicious/unauthorized user.

Figure 8:
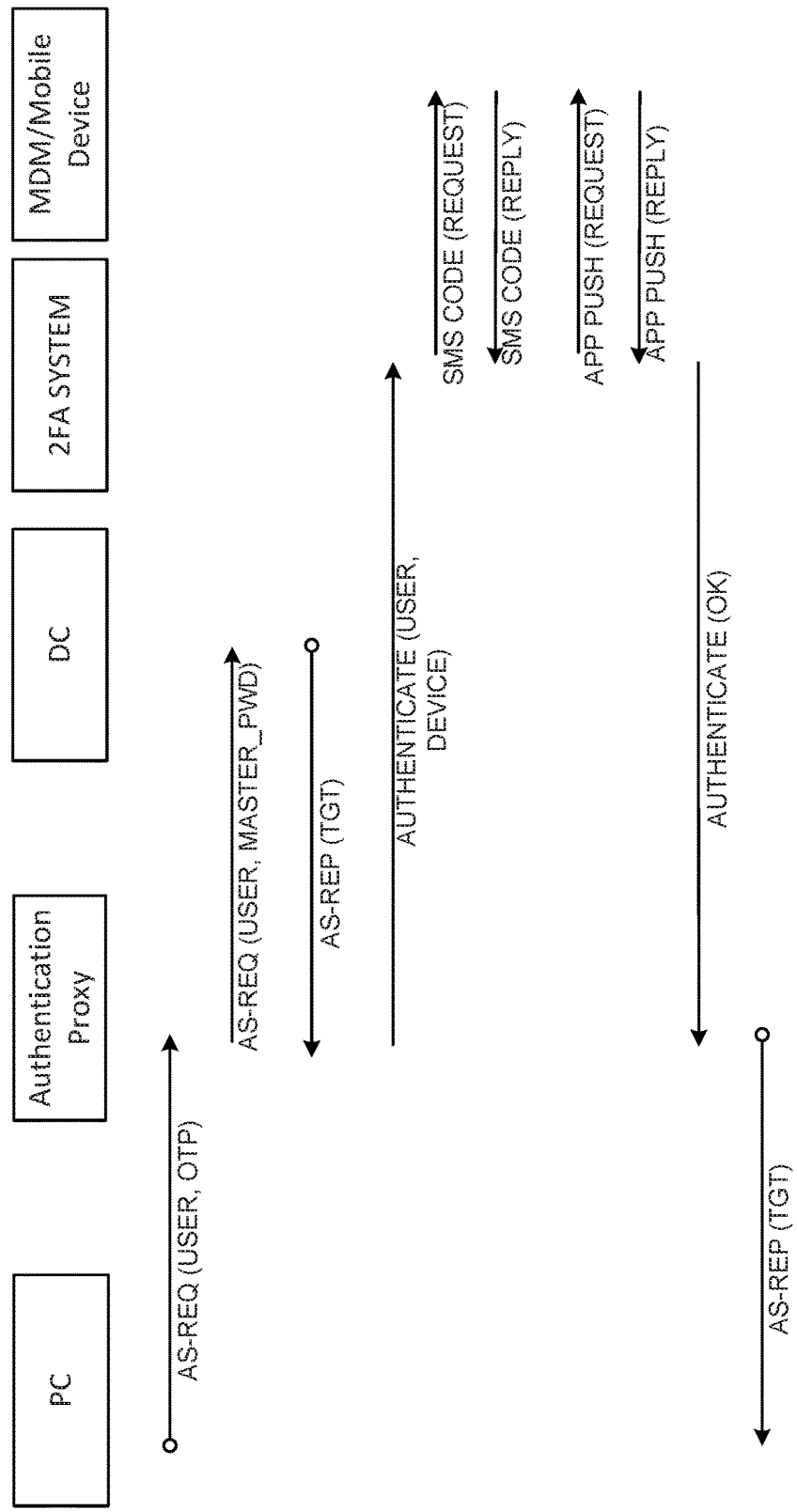

FIG. 8 illustrates a two-factor authentication-proxied authentication flow. In this flow, and as illustrated in FIG. 8, the user sends a Kerberos AS-REQ to the domain controller, asks for TGT to be able to access network resources (login the computer, access files on the file server, etc.), and provides the current timestamp encrypted with the hash of his current password. Thereafter, the authentication proxy sends an AS-REQ message to the domain controller. The authentication proxy, to implement the two-factor authentication discussed above, delays the communication with the user using Kerberos messages to force authentication retries. The domain controller then approves and sends back the TGT for that user with authorization data provided the authentication proxy authenticates the user using additional 2FA system by providing the authenticated user account and device identifier (e.g. mobile phone #). The two-factor authentication system then authenticates the user using a preferred two-factor authentication mechanism (e.g. SMS code sent to the mobile device, push notification sent to the organization application) and if authenticated, the authentication proxy sends back the TGT for that user with authorization data provided.

In other embodiments, the disclosed system ensures that users are legitimate users by relying on one-time password ("OTP") concepts in conjunction with the attack detection described above. These embodiments will be discussed in more detail below.

Currently, AD accounts generally have passwords associated with the accounts. In embodiments of the disclosed system, instead of using that standard password as the authentication method, the disclosed system relies on an OTP to authenticate the account. The OTP is generated based on some master password known to the system and to an appropriate external authentication device (e.g., Google® Authenticator). When an individual wants to use an account, the disclosed system requires that person to provide the OTP from the external device (e.g., mobile device running Google Authenticator) which will complete the authentication process. This OTP functionality could be implemented more easily by changing the password of the relevant AD account to the OTP every X seconds to provide limited access but this protocol generally will not result in as strong a security protocol as true. Due to the implementation of Kerberos, in one embodiment the OTP will be used to generate the TGT during the initial authentication process. Once the TGT is generated, it can be reused to regenerate unlimited TGS tickets for any network resources with the TGT as an (authenticated!) pre-authenticator and the TGT itself can be renewed for multiple times (up to 1 week in default configuration). This means that the simplified OTP implementation cannot be used to actually control the authentication and authorization processes happening with already generated TGT tickets. In addition, OTP-based restrictions generally provide organizations better control of network resources and provide full control for every operation that is authenticated using the Kerberos protocol by manipulation the protocol to respond KRB_TKT_EXPIRED to TGT renewal or TGS service requests to force the user to enter OTP password. Finally, the OTP mechanism allows to create better auditing based on the actual access to the accounts, because every user has a unique OTP generated algorithm, enabling the system to determine which OTP account (and thus which user) accessed which AD account.

Figure 9:
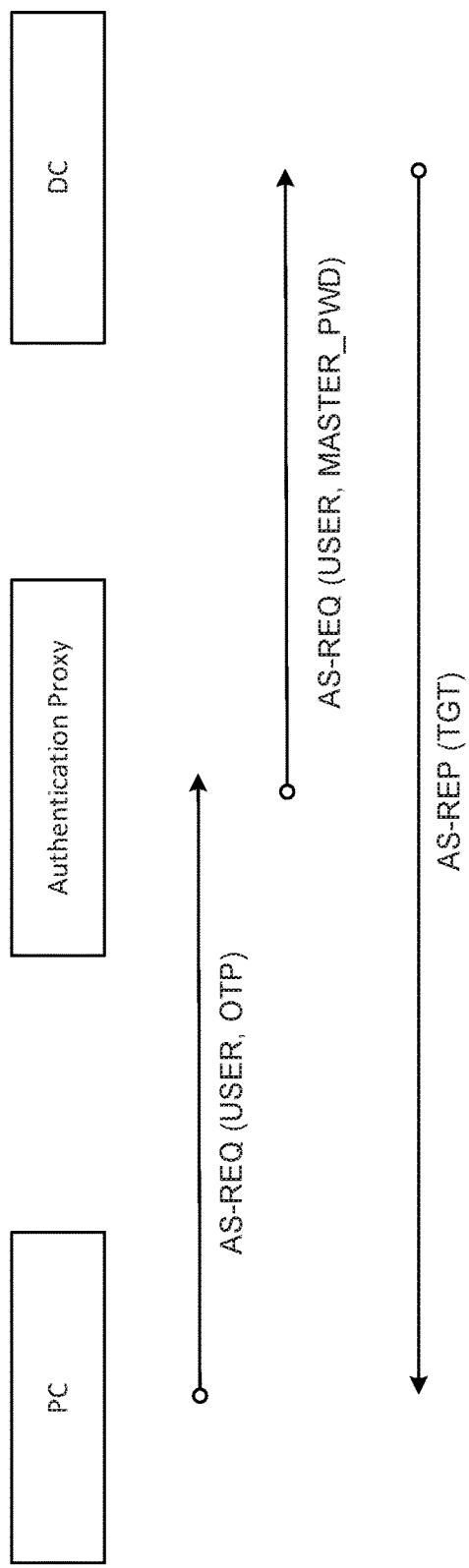

FIG. 9 illustrates an OTP-proxied authentication flow. In this flow, and as illustrated in FIG. 9, the user sends a Kerberos AS-REQ to the domain controller, asks for TGT to be able to access network resources (login the computer, access files on the file server, etc.), and provides the current timestamp encrypted with the hash of his current OTP (external device). Thereafter, the authentication proxy verifies the OTP for the specific account using master password, and sends an AS-REQ to the domain controller with the current timestamp encrypted with the hash of the account's actual password. The domain controller approves and sends back the TGT for that user with authorization data provided.

Figure 10:
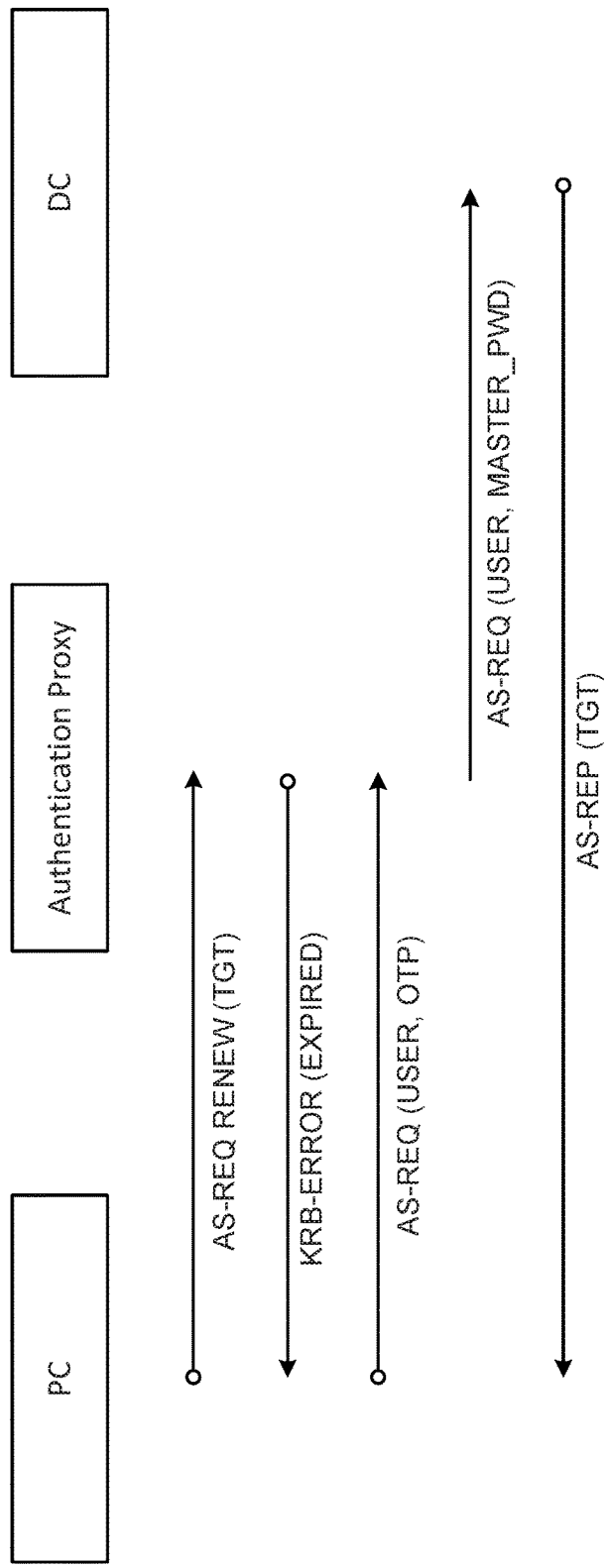

FIG. 10 illustrates an OTP-proxied authentication (renewal) flow. In this flow, and as illustrated in FIG. 10, the user sends a Kerberos AS-REQ to the domain controller, asks for TGT renewal to continue using the pre-generated TGT, and provides the pre-generated TGT. In this flow, the authentication proxy rejects the pre-generated TGT and sends a KRB-ERROR with ticket expired error code and forces the user to restart authentication. The user then sends another AS-REQ to the domain controller, asks for a new TGT, and provides current TGT current timestamp encrypted with the hash of his current OTP (external device). The authentication proxy verifies the OTP for the specific account using master password and sends AS-REQ to the domain controller. It also provides the current timestamp encrypted with the hash of the accounts' actual password. The domain controller then approves and sends back the TGT for that user with authorization data provided.

Figure 11:
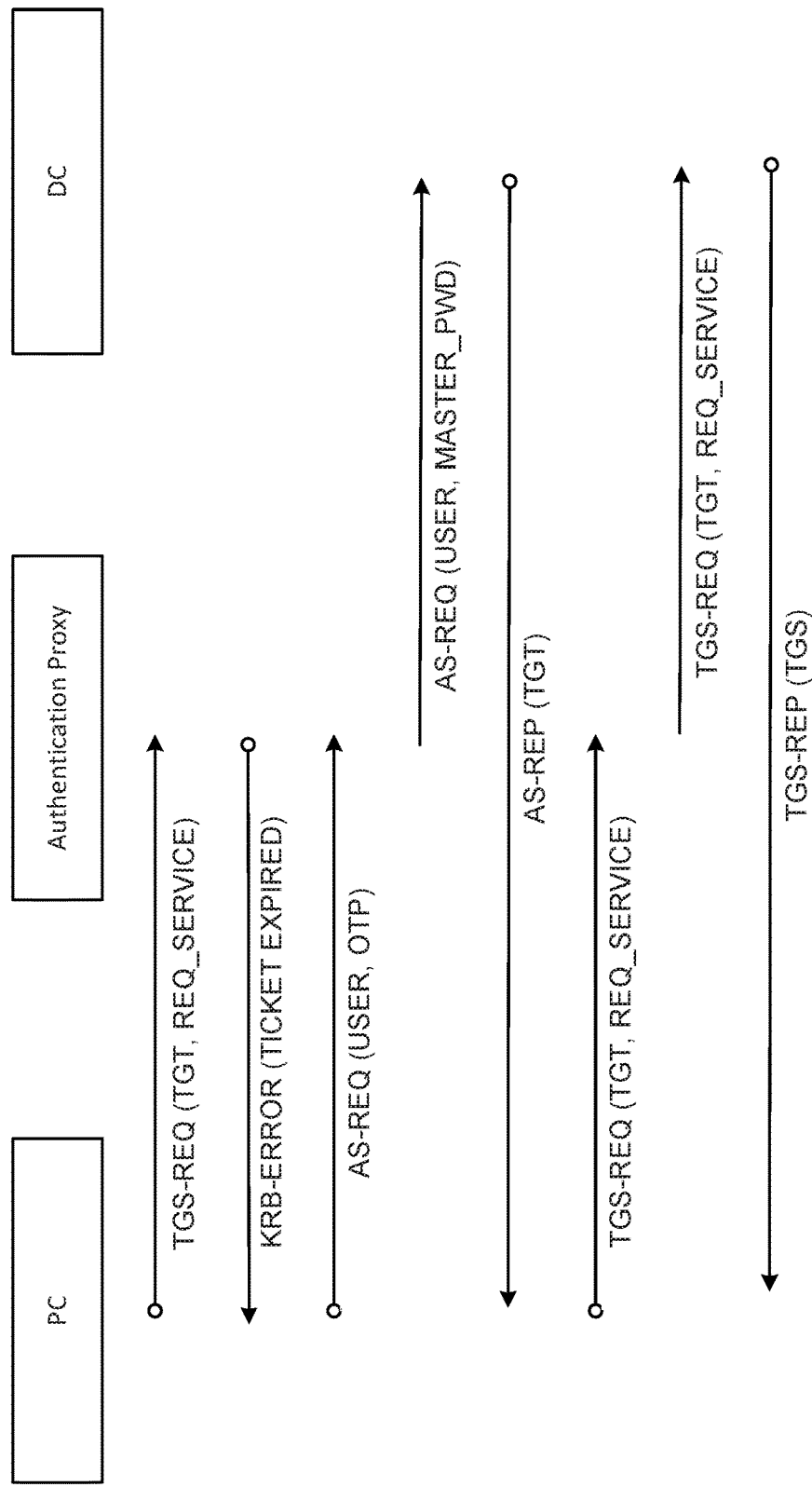

FIG. 11 illustrates an OTP-proxied service access authorization flow. In this flow, and as illustrated in FIG. 11, the user first sends Kerberos TGS-REQ to the domain controller, asks for TGS to access specific network resource, provides the prerequisite TGT, and provides the requested network resource (service). Thereafter, the authentication proxy detects that pre-generated TGT is being reused and this service access requires OTP authentication and sends KRB-ERROR with ticket expired error code to the user, forcing the user to restart authentication. In this flow, the user restarts authentication like in FIG. 10 (i.e., by sending an OTP-proxied normal authentication), and sends TGS-REQ again for the requested service. This time the authentication proxy approves the request and sends the request to the domain controller, which approves and sends back the TGS for that user to the specific network resource with the authorization data provided.

In one embodiment, the disclosed system responds to determined malicious behavior or other attacks by hiding affected TGTs from network traffic and/or from computers on the network.

In one embodiment, the disclosed system responds to detected attacks/malicious behavior by preventing the use of a stolen or potentially stolen KRBTGT. In general, an Identity Centric Firewall includes algorithms to generate a set of the pseudo-random keys based on a particular day. In one embodiment of the disclosed system, the encrypted content of the TGT/any other KRBTGT's signed ticket that is sent from the DC in any scenario would be encrypted again using the current key of the day. Alternatively, the content of the ticket can be encrypted using any other pre-shared key, as appropriate. The hashes of the original TGTs might be shared with all the Identity Centric Firewalls on the day they first appeared. Where an encrypted TGT is sent from a client in a request, the content the TGT would be decrypted using the specified key if the hash is shared, and sent to the DC. Alternatively, the last keys would be tried and send to the DC. Unsuccessful attempts to decrypt the TGT would be indicated by an error returned from the DC, and would suggest an attempt to use a Golden Ticket as described above herein.

This method also prevents usage of the KRBTGT to decrypt sessions, or to inject messages into sessions. The only other option to use stolen KRBTGT is by signing a forged PAC. This method would probably require the attacker to add a PA that for the KDC not to include PAC. This is readily detectable as well.

In one embodiment of the disclosed system, since the keys are not transferred on the network, and under the assumption the attackers can't bypass ICF and access the DC, attackers would have to compromise the ICF in order to use a stolen KRBTGT. In this embodiment, in the event the ICF fails to respond, messages pass unaffected and new TGT would be negotiated with the DC, since the encrypted TGT would not be recognized. Accordingly, malicious activity using a stolen KRBTGT can be prevented.

In one embodiment, the disclosed ICF system includes a so-called Management System Module, illustrated in FIG. 3 as being contained within block 350. In this embodiment, the Management System Module integrates rules to create consolidated, simple alerts for presentation as appropriate. For example, alerts may be presented to the system administrator through a user interface ("UI") or may be presented to a third party management system using an API to that system. In various embodiments, this module implements a built in alert disposition workflow.

In one embodiment, the disclosed system includes a Policy Definition Module (not illustrated in FIG. 3) that enables users to define policies that are then used by the system. Due to the complexity of the different Rules described above and implemented by the disclosed ICF system, various embodiments of the disclosed policy mechanism integrate Rules and their actions into a simple to use interface. The system provides for the categorization of nearly all the network activity on the network, and associates that with the AD organizational structure. When combined, it is possible to create policies based on the different roles in the network and create specific policies based on the source account and destination resource. When compared to static rules, such policies are not IP- or MAC-based, but rather are identity based.

In one embodiment, each Active Directory object can have a different policy defined for accessing resources on the network, while it is it possible to classify every account in real-time and determine its' association (groups, OU's) with according to the requested network resource. The types of potential policies can include simple allow/block policies, but also can integrate more complex policies such as two-factor authentication methods. A sample policy implemented according to one embodiment of the disclosed system is illustrated in the following Table:

| User/System/OU | Target System/Service/Network Asset | Type of Alert | Response |
|---|---|---|---|
| Engineering user | Finance Server | Abnormal Access | Block |
| System Administrator | HR server | Credential misuse | Two Factor authentication |

The following descriptions pertain to additional exemplary embodiments of the systems and methods disclosed herein. It should be appreciated that the features described in the following paragraphs can be incorporated in addition to or instead of the various features described hereinabove.

User and Entity Scoring

In one embodiment, the disclosed system generates scores for users and entities to give visibility on weak users and endpoints. In this embodiment, the scoring advantageously helps organizations focus on weak users that are more likely to be the basis for a security breach. The descriptions that follow provide a capability in the disclosed system for organizations to create the policies described above based, in part, on the user or entity scores. In an example embodiment, the system enables an organization to define a policy that if a user's or entity's score is a certain value, the system requires two factor authentication to occur more frequently, or to occur when that user or entity accesses a service. In a further example embodiment, this additional protection is provided for even if the service is part of the user's profile.

Preempt Risk score is a score given to entities (Users and Machines) based on their exposure to deterministic and probabilistic attacks. This document intends to provide a simplified version of score calculation. It intends to give user an overview of what impacts the Risk score. The actual formula are more complicated and out of scope of this document.

In various embodiments, a plurality of different events can contribute to the calculation of a risk score as described above. In these embodiments, each event is given a score (e.g., low, medium, high and critical severity) between 0 and 1.

Events that contribute to Risk score

Indicators:
(a) Abnormal Service Access
(b) Credential Theft
(c) Forget PAC
(d) Golden Ticket
(e) LDAP Harvesting
(f) Pass-the-Ticket
(g) Password Brute Force
(h) Stale Host
(i) Stale Account
(j) Stale Service
(k) Unusual Working Hours
(l) User Brute Force Active Directory:
(a) Password never expires
(b) Stale Account
(c) Vulnerable OS
(d) Unmanaged Host Entity Metadata:
(a) Weak Password
(b) Exposed Password In some embodiments, additional data is collected to contribute to the calculated risk score, including data collected from third party systems such as Next Generation firewalls, SSO, Email gateways, Honeypots, User Behavior Systems, etc. It should be appreciated that collecting data from these types of third-party systems can in some embodiments provide a more comprehensive risk score.

In various embodiments, the disclosed system implements a so-called risk-score algorithm that determines a risk score for a user or entity based, at least in part, on the above-noted events. In one specific embodiment, the algorithm receives data or information about an entity (user/host) and performs the following steps to generate a risk score:

1. Gather all Risk Factors for the given entity;
2. Group the risk factor into buckets (RiskFactorBucket) by type;
3. For each bucket evaluate the bucket score; and
4. Consolidate the bucket score into one score which is the final risk score In an embodiment, the risk score is calculated by the following equation, where the variables in the equation are defined as immediately below:

$$S_{Total} = [S_1 + (1/a)*S_2 + (1/a)^2*S_3 + \ldots + (1/a)^{n-1}*S_n]*10$$

$S_n$ = Risk score of bucket "n"
n = number of buckets
a = number achieved after applying multiple criteria such as "diminishing return factor", "Max Score Value" etc.
$S_1 \ldots S_n$ are sorted from highest to lowest. Bucket with the highest score contributes the most. The bucket will lesser score has polynomial less impact on the overall score.

Figure 12:
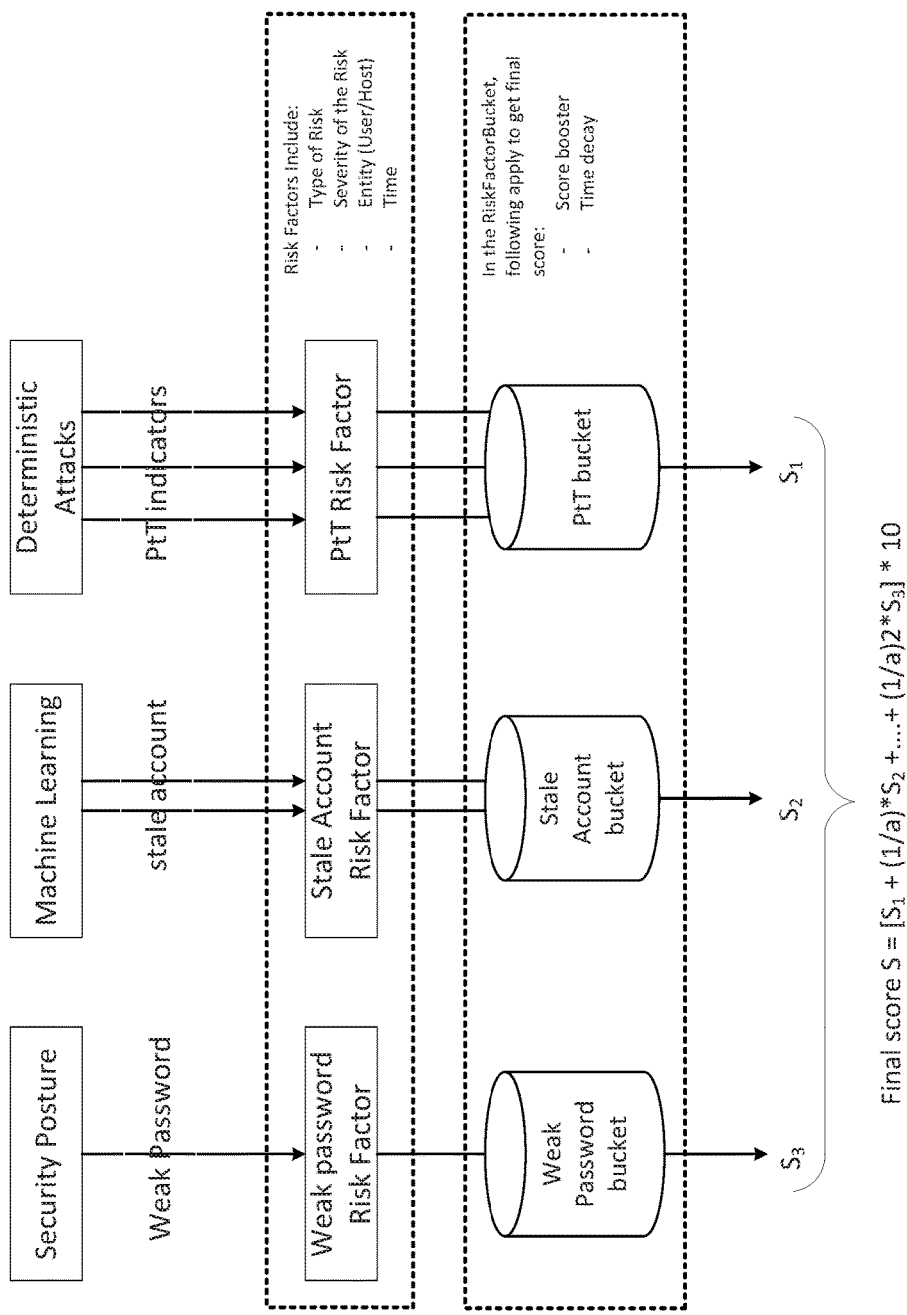
FIG. 12 is a schematic illustration of one example embodiment of a risk score calculation flow chart.

The following example scenario explains the calculation of a risk score. The scenario in this embodiment refers to FIG. 12 hereto. Specifically, in the embodiment of FIG. 12, a scenario is described where three (3) PtT indicators, two (2) stale accounts and one (1) weak password are all reported by the system disclosed herein. In the illustrated embodiment, the indicators are grouped as a risk factor based on entity, severity, time of occurrence etc. Further they are grouped in a bucket called RiskFactorBucket in the example embodiment illustrated in FIG. 12.

In this embodiment, the risk factor bucket score is calculated as follows. First, the disclosed system obtains a base score based on the type of event and maximum severity of the risk factors in bucket. Next, the disclosed system boosts this score by factor that is derived from score boosting properties (e.g. if user is admin or if risk factor occurred frequently). Next, the disclosed system applies a time decay to the risk score to assure that the score is not static over time. For example, if an incident occurs at a specific time and never recurs, its overall impact on the total score gradually goes down as time progresses. In one specific embodiment, the decay of the bucket is determined based on the time elapsed from the time of the latest risk factor in the bucket. The overall bucket score is then calculated by multiplying base score, boost factor, and decay factor.

In various embodiments, additional factors impact risk score calculation. For example, in some embodiments so-called Risk Score Boosters increase the calculated risk score. These risk score boosters may include factors such as whether the entity has administrative access and the frequency of the occurrence of risk factors, either of which is likely to indicate a higher risk of compromising the disclosed system.

As noted above, in various embodiments the disclosed system applies a time decay factor such that if new events do not occur, the risk score decays (or becomes lower) over time. In this way, the occurrence of a single risk factor does not keep a risk score artificially high over a prolonged period of time.

It should be appreciated that in certain embodiments, the disclosed system advantageously obtains data from other commercially available security products like Email Security, DNS Firewalls, Gateway proxies, Honeypots, gateway malware, endpoint security products, etc. to enhance this score and to extend the data on which the score is based.

In various embodiments, the disclosed system enables third party products to be incorporated with the disclosed system. In such embodiments, the disclosed system offers enforcement even if the third party products are not architected to do so. For example, a third-party email security solution could inform the disclosed system that a user clicked on a phishing email, and that the user should accordingly be required to provide two factor authentication for every new service for the rest of the day/week. This represents an improvement over known systems, in which a firewall product allows for blunt block/allow/quarantine reactions. Moreover, this represents an improvement over known firewall solutions, which are not always installed in front of authentication solutions like Active Directory. With a finer range of response options, third party products can use us for enforcement.

It should be appreciated that with the user scores disclosed hereinabove, the disclosed system can engage end users directly when their scores change, or if they do something that impacts their score, etc. This capability advantageously enables users to provide feedback in response to changes in score to attempt to ameliorate or explain the events that lead to a higher user score. This capability advantageously enables users to become an important part of enterprise security without requiring the substantial security training that is needed for existing systems. For example, the disclosed system can provide users feedback as to their user score, password quality, links clicked, and sites visited. This provides for educated users that are engaged in the security enforcement of the disclosed system, leading to fewer security incidents and more accurate alerts. Benefits of this type of system include higher security team productivity, higher return-on-investment, and lower cyber-insurance rates.

It should be appreciated that the disclosed system provides several notable advantages over existing log-based solutions. For example, the disclosed system provides the ability to respond to threats through multiple response mechanisms like 2FA, block, notify, re-authenticate, etc. It also provides the ability to identify deterministic attacks like Golden Ticket, Skeleton Key, Pass the Ticket, Pass the Hash, etc. In various embodiments, the disclosed system can differentiate between user and system accounts, distinguish between strong and weak passwords, automatically block password brute force attacks, and/or prevent account lockouts. In some embodiments, the disclosed system can also advantageously protect Active Directory infrastructure and can provide a full 360 degree view of users including incidents, password strength, login history, unique endpoints, etc. These and other advantages will be apparent to those of skill in the art The above description of is exemplary of the features of the system disclosed herein. It should be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claim.

The invention is claimed as follows:

1. An attack detection and response system comprising:
   at least one processor;
   at least one network interface device; and
   at least one memory device which stores a plurality of instructions to cause the at least one processor to operate with the at least one network interface device to:
   (a) receive all network traffic passing between an external network and a protected computer resource;
   (b) analyze a first portion of the received network traffic from the external network to determine whether the first portion is indicative of an attack on the protected computer resource, wherein the network traffic includes authentication traffic, and the first portion is a request for at least one of access and service,
   wherein the at least one memory device stores a second plurality of instructions indicative of a security policy, the second plurality of instructions are updated based on at least one of external network details, past analyzed external network weaknesses, and past analyzed external network patterns of activity, and
   wherein the determination of whether the first portion is indicative of an attack is based on the security policy; and
   (c) responsive to determining that the analyzed first portion is indicative of an attack on the protected computer resource, perform at least one action selected from the group consisting of: prevent a second portion of the received network traffic from reaching the protected computer resource; issue an alert; modify the second portion of the received traffic; and reconfigure network equipment or privileges.

2. The system of claim 1, wherein the plurality of instructions cause the at least one processor to operate with the at least one network interface device to prevent the second portion of the received network traffic from reaching the protected computer resource by terminating at least one connection to the protected computer resource.

3. The system of claim 1, wherein the plurality of instructions causing the at least one processor to operate with the at least one network interface device to analyze the first portion of the received network traffic includes determining whether the first portion of the received network traffic originates from an unrecognized source.

4. The system of claim 3, wherein responsive to determining that the first portion of the received network traffic originates from the unrecognized source, the plurality of instructions cause the at least one processor to operate with the at least one network interface device to communicate a notification of a need for multi-factor authentication.

5. The system of claim 1, wherein the at least one processor operates with the at least one network interface device to enforce the security policy.

6. The system of claim 1, wherein the plurality of instructions further cause the at least one processor to operate with the at least one network interface device to receive the security policy from a third party resource.

7. An attack detection and response method comprising:
(a) receiving, by at least one processor operating with at least one network device, all network traffic passing between an external network and a protected computer resource;
(b) analyzing, by the at least one processor operating with the at least one network device, a first portion of the received network traffic from the external network to determine whether the first portion is indicative of an attack on the protected computer resource, wherein the network traffic includes authentication traffic, and the first portion is a request for at least one of access and service,
wherein at least one memory device stores a plurality of instructions indicative of a security policy, the plurality of instructions are updated based on at least one of external network details, past analyzed external network weaknesses, and past analyzed external network patterns of activity, and
wherein the determination of whether the first portion is indicative of an attack is based on the security policy; and
(c) responsive to determining that the analyzed first portion is indicative of an attack on the protected computer resource, performing at least one action selected from the following: preventing, by the at least one processor operating with the at least one network device, a second portion of the received network traffic from reaching the protected computer resource; issuing an alert, modifying the second portion of the received traffic; and reconfiguring network equipment or privileges.

8. The method of claim 7, wherein preventing the second portion of the received network traffic from reaching the protected computer resource includes terminating at least one connection to the protected computer resource.

9. The method of claim 7, wherein analyzing the first portion of the received network traffic includes determining whether the first portion of the received network traffic originates from an unrecognized source.

10. The method of claim 9, wherein responsive to determining that the first portion of the received network traffic originates from the unrecognized source, communicating, by the at least one processor operating with the at least one network interface device, a notification of a need for multi-factor authentication.

11. The method of claim 7, further comprising enforcing, by the at least one processor operating with the at least one network interface device, the security policy.

12. The method of claim 11, further comprising receiving, by the at least one processor operating with the at least one network interface device, the security policy from a third party resource.

13. A computer-readable non-transitory storage medium storing executable instructions for attack detection and response, which when executed by a computer system, cause the computer system to:
(a) receive, by at least one processor operating with at least one network device, all network traffic passing between an external network and a protected computer resource;
(b) analyze, by the at least one processor operating with the at least one network device, a first portion of the received network traffic from the external network to determine whether the first portion is indicative of an attack on the protected computer resource, wherein the network traffic includes authentication traffic, and the first portion is a request for at least one of access and service,
wherein at least one memory device stores a plurality of instructions indicative of a security policy, the plurality of instructions are updated based on at least one of external network details, past analyzed external network weaknesses, and past analyzed external network patterns of activity, and
wherein the determination of whether the first portion is indicative of an attack is based on the security policy; and
(c) responsive to determining that the analyzed first portion is indicative of an attack on the protected computer resource, perform at least one of the following actions: prevent, by the at least one processor operating with the at least one network device, a second portion of the received network traffic from reaching the protected computer resource; issue an alert; modify the second portion of the received traffic; and reconfigure network equipment or privileges.

14. The computer-readable non-transitory storage medium of claim 13, wherein preventing the second portion of the received network traffic from reaching the protected computer resource includes terminating at least one connection to the protected computer resource.

15. The computer-readable non-transitory storage medium of claim 13, wherein analyzing the first portion of the received network traffic includes determining whether the first portion of the received network traffic originates from an unrecognized source.

16. The computer-readable non-transitory storage medium of claim 15, wherein responsive to determining that the first portion of the received network traffic originates from the unrecognized source, the plurality of instructions, when executed by the computer system, further cause the computer system to communicate, by the at least one processor operating with the at least one network interface device, a notification of a need for multi-factor authentication.

17. The computer-readable non-transitory storage medium of claim 13, wherein the plurality of instructions, when executed by the computer system, further cause the computer system to enforce, by the at least one processor operating with the at least one network interface device, the security policy.

18. The system of claim 1, wherein the second portion of the received network traffic contains an indication of approval.

19. An attack detection and response system comprising:
at least one processor;
at least one network interface device; and
at least one memory device which stores a plurality of instructions to cause the at least one processor to operate with the at least one network interface device to:
(a) receive all network traffic passing between an external network and a protected computer resource;
(b) analyze a first portion of the received network traffic from the external network to determine whether the first portion is indicative of an attack on the protected computer resource, wherein the first portion is a request for at least one of access and service;
(c) responsive to determining that the analyzed first portion is indicative of an attack on the protected computer resource, request the external network to verify an identity by at least one of two-factor authentication, multi-factor authentication, re-authentication, and notification to an administrator; and
(d) responsive to a verification failure, perform at least one action selected from the group consisting of: prevent a second portion of the received network traffic from reaching the protected computer resource; issue an alert; modify the second portion of the received traffic; and reconfigure network equipment or privileges.

20. The system of claim 19, wherein the plurality of instructions further cause the at least one processor to operate with the at least one network interface device to update a security policy based on at least one of external network details, past analyzed external network weaknesses, and past analyzed external network patterns of activity.

21. The system of claim 19, wherein the second portion of the received network traffic contains an indication of approval.

* * * * *